US007957862B2

(12) United States Patent
Kaita et al.

(10) Patent No.: US 7,957,862 B2

(45) Date of Patent: Jun. 7, 2011

(54) ELECTRONIC CONTROL APPARATUS FOR VEHICLE

(75) Inventors: Keiji Kaita, Nishikamo-gun (JP); Katsuhiro Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1382 days.

(21) Appl. No.: 11/410,161

(22) Filed: Apr. 25, 2006

(65) Prior Publication Data

US 2006/0276947 A1 Dec. 7, 2006

(30) Foreign Application Priority Data

Jun. 1, 2005 (JP) ................................ 2005-161190

(51) Int. Cl.
*G06F 11/30* (2006.01)
*G06F 19/00* (2006.01)

(52) U.S. Cl. ............... 701/33; 702/185; 714/47; 714/48

(58) Field of Classification Search .................. 701/114, 701/33, 29, 101, 102, 115, 34; 340/438; 702/185, 183; 307/10.3; 180/443; 123/399; 361/62; 324/418; 714/55, 47, 48, 49

See application file for complete search history.

(56) References Cited

U.S. PATENT DOCUMENTS

| | | | | |
|---|---|---|---|---|
| 3,931,714 | A * | 1/1976 | Jaegtnes et al. | 60/660 |
| 5,095,438 | A * | 3/1992 | Sasaki | 701/114 |
| 5,136,498 | A * | 8/1992 | McLaughlin et al. | 700/79 |
| 5,210,756 | A * | 5/1993 | Kummer et al. | 714/4 |
| 5,411,324 | A * | 5/1995 | Zydek et al. | 303/122.05 |
| 5,640,057 | A * | 6/1997 | Hirata et al. | 307/10.3 |
| 6,672,282 | B2 * | 1/2004 | Harrison et al. | 123/399 |
| 2002/0161495 | A1 * | 10/2002 | Yamaki | 701/33 |
| 2003/0080746 | A1 * | 5/2003 | Imai et al. | 324/418 |
| 2004/0223275 | A1 * | 11/2004 | Yanagida et al. | 361/62 |
| 2005/0021304 | A1 * | 1/2005 | Hirashima | 702/185 |
| 2005/0033494 | A1 * | 2/2005 | Harada et al. | 701/36 |
| 2005/0033503 | A1 * | 2/2005 | Yamamoto | 701/114 |

(Continued)

FOREIGN PATENT DOCUMENTS

DE 101 10 046 A1 9/2002

(Continued)

OTHER PUBLICATIONS

Aug. 31, 2010 Decision to Grant Patent issued in Japanese Patent Application No. 2005-161190 (with translation).

*Primary Examiner* — Ronnie Mancho

(74) *Attorney, Agent, or Firm* — Oliff & Berridge, PLC

(57) ABSTRACT

A plurality of electronic control units (ECU) are classified under a plurality of ECU groups. A relay is provided for each ECU group, and connected between each ECU in a corresponding group and a power supply. Connection is established between respective ECUs by a communication network. When power is turned ON, each ECU outputs a flag indicating its own communication enabled state as long as there is no error in the communication function. A relay error detection portion detects, based on communication state information indicating whether each ECU is in a communication enabled state or communication disabled state, an error of the relay when the communication state information between ECU groups is inconsistent. Thus, an error in a relay that is provided for each group can be detected with a simple configuration.

28 Claims, 5 Drawing Sheets

U.S. PATENT DOCUMENTS

2005/0107977 A1* 5/2005 Edwards et al. .............. 702/118
2005/0159866 A1* 7/2005 Takeuchi et al. ................ 701/41

FOREIGN PATENT DOCUMENTS

JP A-05-047281 2/1993
JP A-08-163371 6/1996
JP A-10-63964 3/1998
JP A-10-275550 10/1998
JP A-2000-23380 1/2000
JP A 2004-064626 2/2004
KR 10-0181666 B1 8/1998
KR 10-0179185 B1 11/1998

* cited by examiner

ELECTRONIC CONTROL APPARATUS FOR VEHICLE

This nonprovisional application is based on Japanese Patent Application No. 2005-161190 filed with the Japan Patent Office on Jun. 1, 2005, the entire contents of which are hereby incorporated by reference.

BACKGROUND OF THE INVENTION

1. Field of the Invention

The present invention relates to an electronic control apparatus for a vehicle, more particularly to an electronic control apparatus configured to supply power to a plurality of electronic control units (ECU) via a relay.

2. Description of the Background Art

Significant development has been seen in vehicles such as automobiles with respect to electronics in view of improving the driving performance, convenience, safety, and the like. Accordingly, the electronic control apparatus for a vehicle is formed of many electronic control units. These ECUs are divided into a plurality of groups based on the control object function and the like.

For example, Japanese Patent Laying-Open No. 2004-064626 (hereinafter, referred to as Patent Document 1) discloses a communication system for a vehicle having an on-vehicle network implemented for each group in an electronic control apparatus including a plurality of ECUs divided into a plurality of groups. Particularly, the configuration disclosed in Patent Document 1 allows data communication to be restored promptly to the proper state when normal data communication is disabled due to communication line disconnection, failure of the gateway device, increase in processing load, and the like.

Power is generally supplied to an ECU via a relay. An electronic control apparatus including a plurality of ECUs employs the configuration in which the plurality of ECUs are divided into a plurality of systems (groups) and an independent relay is arranged for each group in consideration of preventing power cut-off to all the ECUs at the time of relay error and/or from the standpoint of the current capacitance of each relay.

The ON/OFF of the relay is controlled such that power is supplied to each ECU during vehicle operation, and power supply to each ECU is cut-off when the vehicle operation is stopped. Although the electronic control apparatus may be designed such that the power supply initiating timing is slightly deviated between each group in order to prevent excessive starting current at the time of starting the vehicle, each relay basically has its ON/OFF controlled in common with the exception of the starting timing.

There is a rare case where a relay is turned OFF or ON erroneously due to hardware failure or a setting error of an exciting signal directed to controlling the ON/OFF of the relay. In this case, there is a possibility of an ECU being disabled in operation during driving due to power cut-off, or power consumption being wasted continuously to cause the battery to run down due to an ECU being continuously connected to the power source even when the vehicle operation has been stopped.

Such occurrence of a relay on/off error must be quickly detected to effect an appropriate power processing or to notify the driver of such an error. A general method of sensing a relay error includes the step of applying an exciting signal that controls each relay into one ECU, and detecting inconsistency in the logic of the input exciting signals. This method will increase the fabrication cost due to the necessity of a configuration in which a plurality of exciting signals are applied to an ECU, i.e. a configuration with signal lines for transmitting respective exciting signals, port installation at the ECU, and the like.

There is also the problem of how the relay, when a relay error is detected, is to be operated. From the standpoint of continuing the operation of the vehicle, it is desirable to turn ON each relay when a relay error is detected. However, power consumption may be wasted continuously if each relay is unnecessarily ON continuously, leading to the possibility of the battery running down.

SUMMARY OF THE INVENTION

An object of the present invention is to detect with a simple configuration an error in a relay provided for each group and effect an appropriate error procedure when a relay error is detected in an electronic control apparatus formed of a plurality of ECUs divided into a plurality of systems (groups).

According to an aspect of the present invention, an electronic control apparatus for a vehicle of the present invention includes a plurality of electronic control units, a relay, a relay control portion, a communication portion, and a relay error detection portion. The plurality of electronic control units is divided (classified) into a plurality of groups (ECU groups). A relay is provided for each group, and is connected between the electronic control unit belonging to the corresponding group and a power supply. The relay control portion generates a signal controlling the ON and OFF of the relay in response to an operation instruction to the vehicle. The communication portion is connected to at least one electronic unit in a plurality of the groups and is configured to establish communication with the connected electronic control unit. The relay error detection portion is provided in at least one of the electronic control units connected to the communication portion. The relay error detection portion detects a relay error, based on communication state information indicative of a communication enabled state or communication disabled state of each electronic control unit connected to the communication portion, when the communication state information is inconsistent between the groups.

In accordance with the electronic control apparatus for a vehicle set forth above, attention is focused on a communication disabled state at an electronic control unit having power supply cut-off by the relay being turned OFF. Inconsistency in the ON/OFF state of a plurality of relays that have the ON/OFF controlled in common (occurrence of relay error) can be detected based on the inconsistency in the ECU communication state information between the groups without having to input a particular signal directed to controlling each relay to the ECU. Therefore, a configuration of applying a particular signal to detect a relay error into an ECU is dispensable. A relay error can be detected without having to increase the fabrication cost by utilizing a generally-provided communication function (on-vehicle LAN or the like) among a plurality of ECUs.

Preferably in the electronic control apparatus for a vehicle of the present invention, a plurality of electronic control units are connected to the communication portion in each group. The relay error detection portion detects the relay error when each of the electronic control units belonging to the group where the relay error detecting portion is included is in the communication enabled state and each of the electronic control units connected to the communication portion in another group is in the communication disabled state.

In the electronic control apparatus for a vehicle set forth above, a relay error is detected on the condition that all the communication state information of the plurality of ECUs in each group are available. In each ECU of the same group, the possibility of occurrence of a communication disabled state caused by communication function failure despite power being turned ON is extremely low. Therefore, the probability of mistaking ECU communication function failure for a relay OFF state can be reduced to prevent erroneous detection of a relay error and to improve detection accuracy.

Further preferably, the electronic control apparatus for a vehicle of the present invention includes a vehicle state determination portion, and an error determination portion. The vehicle state determination portion determines the state of the vehicle when the relay error is detected by the relay error detection portion. The error determination portion determines which of a first error and a second error has occurred according to the determination result by the vehicle state determination portion. The first error corresponds to the case where the relay corresponding to the group in which an electronic control unit of the communication enabled state belongs is ON erroneously. The second error corresponds to the case where the relay corresponding to the group in which an electronic control unit of the communication disabled state belongs is OFF erroneously.

When a relay error is detected by inconsistency in the communication state information between groups by the control apparatus for a vehicle set forth above, determination is made as to whether the vehicle is under a state in which each relay is to be fundamentally ON or OFF. Accordingly, determination is made between occurrence of an incorrect ON state in which the relay corresponding to a communication enabled ECU is erroneously ON (first error) and occurrence of an incorrect OFF state in which the relay corresponding to a communication disabled ECU is erroneously OFF.

Further preferably, in the electronic control apparatus for a vehicle of the present invention, the vehicle state determination portion includes an operation halt determination portion determining whether the vehicle is in an operation halt state or not when the relay error is detected by the relay error detection portion. The error determination portion determines that the relay corresponding to the group in which the electronic control unit in the communication enabled state belongs is erroneously ON when determination is made of the vehicle being in the operation halt state.

According to the electronic control apparatus for a vehicle set forth above, it is assumed that each relay is to be fundamentally turned OFF when the vehicle is in an operation halt state to allow determination of an erroneous ON state of the relay corresponding to a communication enabled ECU.

In such a configuration, the electronic control apparatus for a vehicle further includes a power supply cut-off portion. The power supply cut-off portion instructs the relay control portion to turn OFF the relay determined as being erroneously ON by the error determination portion.

By the control of turning OFF the relay in an erroneous ON state in the electronic control apparatus for a vehicle set forth above, occurrence of power consumption being wasted due to continuous supply of power to an ECU that is essentially not required can be prevented such that battery does not run down.

Alternatively, the electronic control apparatus for a vehicle is configured to further include a power consumption reduction portion. The power consumption reduction portion instructs transition to a standby mode with respect to each electronic control unit belonging to the group corresponding to the relay determined as being ON erroneously by the error determination portion.

By the electronic control apparatus for a vehicle set forth above, the ECU connected to the relay that is in an incorrect ON state can be shifted to a standby state to reduce power consumption thereof Accordingly, unnecessary power consumption due to continuous supply of power to an ECU that is fundamentally not required can be reduced to prevent the battery from running down even in the case of incorrect ON error due to hardware failure.

Further preferably in the electronic control apparatus for a vehicle of the present invention, the vehicle state determination portion includes an operation halt determination portion determining whether the vehicle is in an operation halt state or not when the relay error is detected by the relay error detection portion. The error determination portion determines that the relay corresponding to the group in which the electronic control unit in the communication disabled state belongs is turned OFF erroneously when determination is made of the vehicle not being in the operation halt state.

In accordance with the electronic control apparatus for a vehicle set forth above, it is assumed that each relay is to be fundamentally on when the vehicle is not in an operation halt state to determine that the relay corresponding to the ECU in a communication disabled state is erroneously turned OFF.

Particularly in such a configuration, the electronic control apparatus for a vehicle further includes a power supply restore portion. The power supply restore portion instructs the relay control portion to turn ON the relay that is determined to be erroneously OFF by the error determination portion.

By turning ON again the relay determined to be in an incorrect OFF state by the electronic control apparatus for a vehicle set forth above, power can be supplied to the ECU that is to be operated.

Alternatively, further preferably in the electronic control apparatus for a vehicle of the present invention, the vehicle state determination portion includes a timer portion sensing elapse of a predetermined time from the point in time of detecting the relay error, when detected by the relay error detection portion. The electronic control apparatus further includes a power supply restore portion. The power supply restore portion instructs the relay control portion to turn ON, until elapse of the predetermined time is sensed by the timer portion, the relay corresponding to the group in which the electronic control unit in the communication disabled state belongs.

In accordance with the electronic control apparatus for a vehicle set forth above, control is effected such that each relay is turned ON until elapse of the predetermined time to allow operation of each ECU even in the case where a relay error is once detected by inconsistency in the communication state information between the groups. Thus, the operation of each ECU is given priority even when a relay error is detected, allowing the electronic control apparatus to be operated in terms of driving safely.

Particularly in the configuration set forth above, the vehicle state determination portion further includes an occupant determination portion for determining whether the vehicle driver is present or not when elapse of the predetermined time is sensed by the timer portion, and the electronic control apparatus further includes a power supply cut-off portion. The power supply cut-off portion instructs the relay control portion to turn OFF each relay when determination is made of the absence of the driver by the occupant determination portion.

According to the electronic control apparatus for a vehicle set forth above, determination can be made whether the vehicle state corresponds to a state in which each relay is to be turned ON or turned OFF according to the presence or absence of the vehicle driver, at elapse of the predetermined time from detecting a relay error. Further, when the driver is absent, power consumption being wasted due to continuous supply of power that is fundamentally unnecessary to an ECU can be suppressed by turning OFF the relay to prevent the battery from running down.

Alternatively, the vehicle state determination portion further includes an occupant determination portion for determining whether the vehicle driver is present or not when elapse of the predetermined time is sensed by the timer portion, and the electronic control apparatus further includes a power consumption reduction portion. The power consumption reduction portion instructs transition to a standby mode for each electronic control unit in the group in which the electronic control unit in a communication enabled state belongs when determination is made of the driver being absent by the occupant determination portion.

By the electronic control apparatus for a vehicle set forth above, determination can be made whether the vehicle state corresponds to a state in which each relay is to be turned ON or OFF according to the presence/absence of the vehicle driver at elapse of the predetermined time from sensing a relay error. When the driver is absent, transition to a standby mode for the ECU connected to a relay in an incorrect ON state allows power consumption thereof to be reduced. Accordingly, power consumption due to continuous supply of power to an ECU can be reduced to prevent the battery from running down.

In accordance with the configuration set forth above, the vehicle state determination portion further includes an occupant determination portion determining presence/absence of the vehicle driver when elapse of the predetermined time is sensed by the timer portion, and the electronic control apparatus further includes an error procedure portion. The error procedure portion instructs the relay control portion to turn each relay ON or OFF based on a predetermined pattern when the occupant determination portion determines presence of the driver. The predetermined pattern is determined in advance taking into account the function of the electronic control unit belonging to each group.

According to the electronic control apparatus for a vehicle set forth above, determination can be made of a vehicle state in which each relay is to be turned ON or OFF according to the presence/absence of the vehicle driver at elapse of a predetermined time from detecting a relay error. When the driver is present, power supply to an ECU that has a significant effect on the vehicle operation is continued while power supply to an ECU that does not have a significant effect even if its operation is stopped is ceased, taking into account the characteristics or role of the ECU belonging to each group. Therefore, power consumption can be reduced. Accordingly, balance is achieved between ensuring the vehicle operation function and saving battery power.

Thus, the main advantage of the present invention is to detect, with a simple configuration, an error in a relay provided for each group and conduct an appropriate error procedure when a relay error is detected based on a configuration in which a plurality of ECUs are divided into a plurality of systems (groups).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
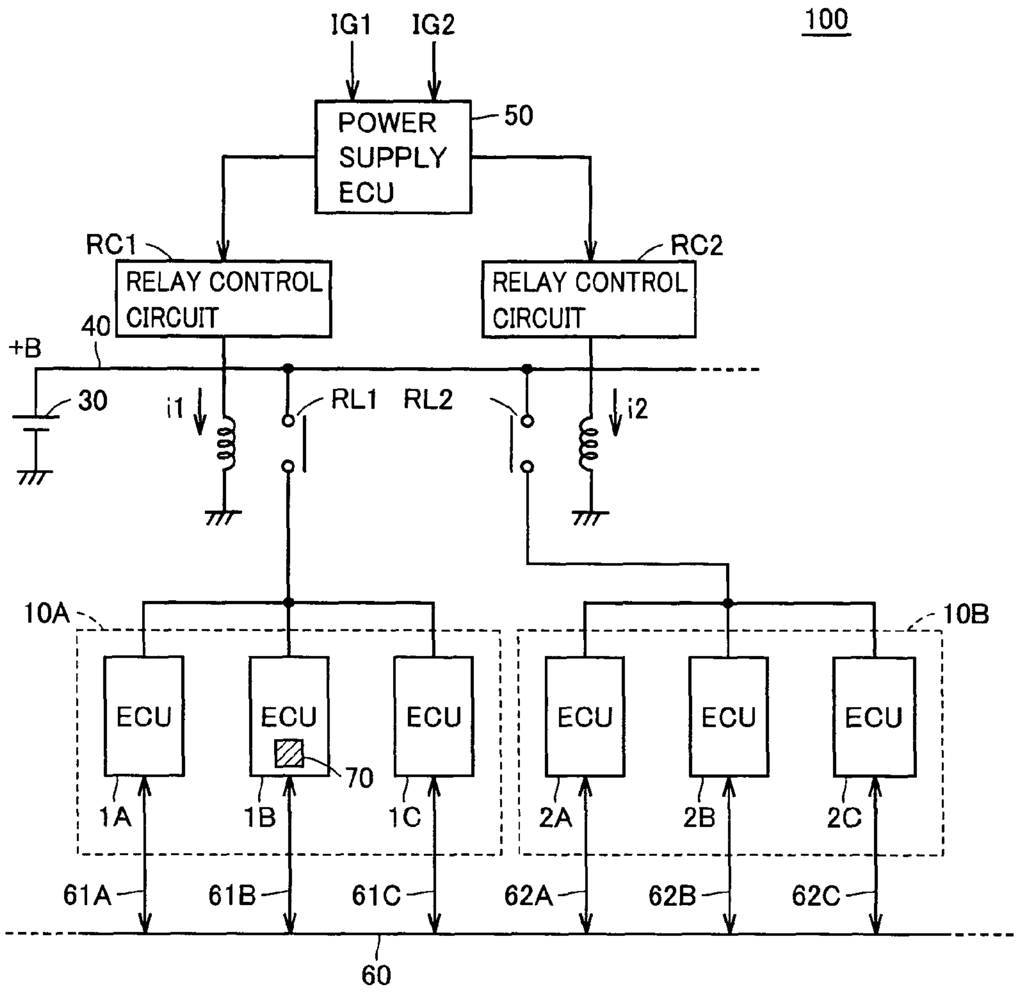
FIG. 1 is a block diagram of a configuration of an electronic control apparatus according to an embodiment of the present invention.

Embodiments of the present invention will be described hereinafter with reference to the drawings. In the drawings, the same or corresponding elements have the same reference characters allotted, and their description will not be repeated.

Referring to FIG. 1, an electronic control apparatus 100 according to an embodiment of the present invention includes a plurality of electronic control units (ECU), a power supply 30, a power supply line 40, a power supply ECU 50, relays R1 and R2, relay control circuits RC1 and RC2, and a cornrnunication network 60.

The plurality of ECUs is divided into a plurality of groups. In the example shown in FIG. 1, the ECUs are classified under ECU groups 10A and 10B. ECU group 10A includes ECUs 1A-1C. ECU group 10B includes ECUs 2A-2C.

The number of ECUs included in one ECU group is not limited, and is arbitrary. In the present embodiment, a configuration in which the ECUs are classified under two ECU groups is shown. However, the ECUs may be classified under three or more ECU groups.

Power supply 30 is typically formed of a battery, and supplies an operating power supply voltage +B for an ECU onto power supply line 40. A relay is provided for each ECU group. ECUs 1A-1C belonging to ECU group 10A are connected with power supply line 40 via relay RL1. ECUs 2A-2C belonging to ECU group 10B are connected with power supply line 40 via relay RL2.

Power supply ECU 50 receives an exciting signal IG1 regulating the power supply period to ECU group 10A, and an exciting signal IG2 regulating the power supply period to ECU group 10B. Power supply ECU 50 instructs relay control circuit RC1 the supply of an exciting current I1 in response to exciting signal IG1 and instructs relay control circuit RC2 the supply of an exciting current I2 in response to exciting signal IG2.

Relay RL1 is ON during the period of time where exciting current I1 is supplied to a corresponding relay coil and turned OFF when exciting current I1 is not supplied. Similarly, relay RL2 is turned ON during the period of time where exciting current I2 is supplied to a corresponding relay coil, and turned OFF when exciting current I2 is not supplied. Thus, the ON/OFF of relays RL1 and RL2 is set according to exciting signals IG1 and IG2.

Exciting signals IG1 and IG2 are set to instruct relay ON in response to an operation start operation (for example, the ON operation of the ignition switch) of the vehicle on which electronic control apparatus 100 is mounted, and instruct relay OFF in response to an operation end operation (for example, the OFF operation of the ignition switch). Exciting signals IG1 and IG2 can be set such that the relay ON timing is slightly deviated between respective ECU groups in order to prevent increase in the starting current, taking into account the role and the like of the ECU in each ECU group. Relays RL1 and RL2 basically have their ON/OFF controlled in common except at the time of starting. In other words, the logic inconsistency (difference in setting level) between exciting signals IG1 and IG2 does not basically occur.

Communication network 60 is representatively constituted of an on-vehicle LAN (Local Area Network). Data or signals can be transferred between the ECUs connected on communication network 60 to allow information to be shared. In the example of FIG. 1, ECUs 1A-1C and ECUs 2A-2C are connectable with communication network 60 by communication functions 61A-61C and 62A-62C.

Each ECU connected on communication network 60 outputs the flag indicating its capability of communication when power is turned ON as long as there is no error in the communication function. In contrast, an ECU that does not have power turned ON cannot output the flag indicating its capability of communication. Therefore, each ECU connected on communication network 60 can obtain "communication state information" indicative of a communication disabled state or a communication enabled state with respect to each of other ECUs by the presence/absence of such flag output. The communication function between the ECUs set forth above can be implemented by using an element generally provided at an electronic control apparatus incorporated in a vehicle such as an automobile, as disclosed in Patent Document 1.

In the application of the present invention, a configuration in which a local communication channel is provided between predetermined ECUs can be employed instead of the communication network shown in FIG. 1 as long as the aforementioned communication state information can be obtained between predetermined ECUs.

In electronic control apparatus 100 of the present embodiment, at least one ECU connected on communication network 60 includes a relay error detector 70. Relay error detector 70 is indicated as a function block realized by a program process executed by an ECU.

In the example shown in FIG. 1, it is assumed that relay error detector 70 is provided in ECU 1B belonging to ECU group 10A. It is to be noted that relay error detector 70 can be provided with respect to an ECU that allows communication with an ECU of another ECU group.

Figure 2:
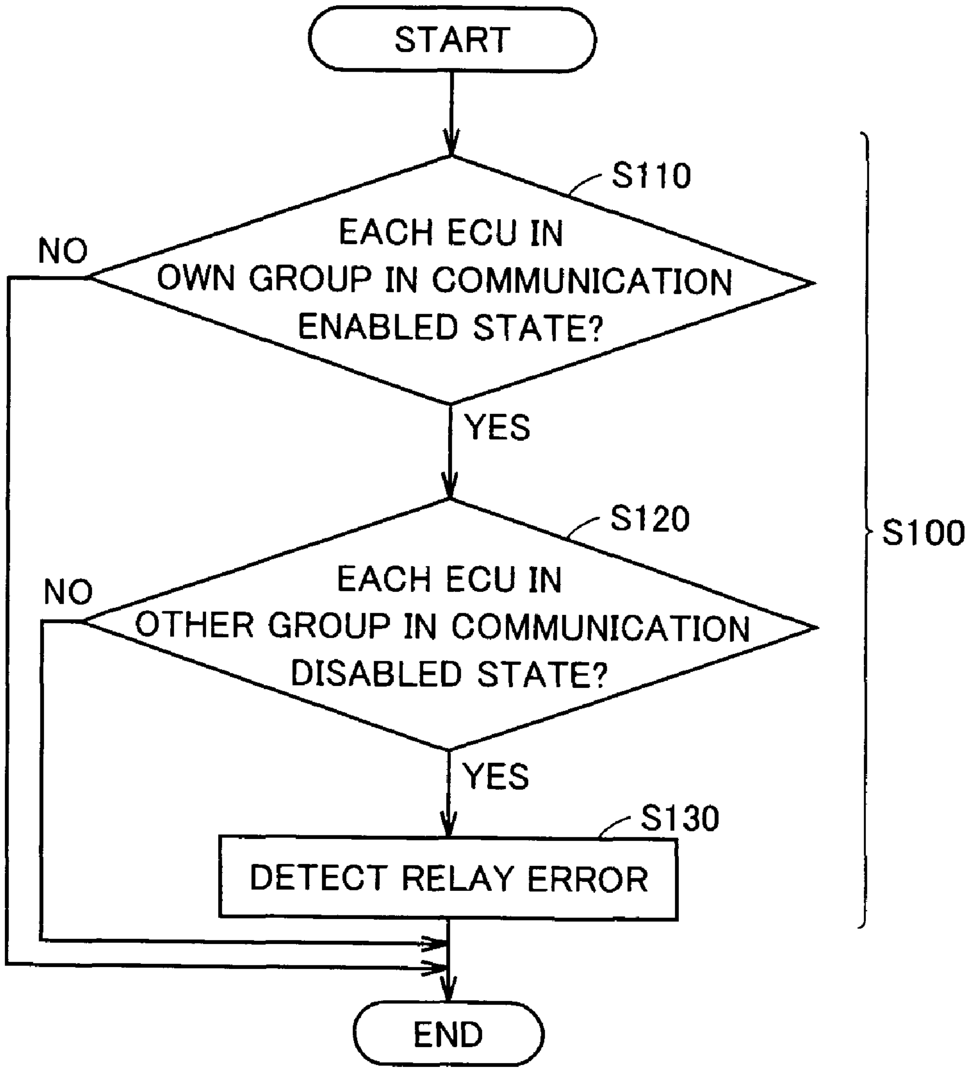
FIG. 2 is a flow chart of detecting a relay error by the relay error detector shown in FIG. 1.

FIG. 2 is a flow chart to describe a relay error detection control by relay error detector 70.

Referring to FIG. 2, relay error detector 70 detects a relay error through an error detection step S100 including steps S110-S130.

At step S110, relay error detector 70 determines whether each ECU in its own ECU group (each of ECUs 1A-1C in ECU group 10A in the example of FIG. 1) is in a communication enabled state or not.

At step S120, relay error detector 70 determines whether each ECU in the other ECU group (each of ECUs 2A-2C in ECU group 10B in the example of FIG. 1) is in a communication disabled state or not.

When YES at both steps S110 and S120, relay error detector 70 detects a relay error at step S130 since relays RL1 and RL2 that are to be controlled essentially in common have different ON and OFF states.

When at least one of steps S110 and S120 provides a NO determination, relay error detector 70 skips step S130 and does not detect a relay error.

Thus, it is recognized that power supply voltage +B is supplied to each ECU in its own ECU group 10A by the ON state of relay RL1 while relay RL2 is in an OFF state such that power supply to each of ECUs 2A-2C is cut-off when each ECU in ECU group 10B is in a disabled state.

The possibility is extremely low of the occurrence of a communication disabled state caused by failure in the communication function in spite of power supply voltage +B being applied to all ECUs in the same ECU group 10B. Therefore, error detection step S100 allows detection of inconsistency in the ON/OFF state of a plurality of relays that should be ON/OFF in common (that is, occurrence of a relay error) based on inconsistency in the communication state information (a communication enabled state or communication disabled state) without having to input a particular signal (exciting signals IG1 and IG2) into the ECU.

By determining whether or not all the communication state information are consistent for all the plurality of ECUs in each ECU group (preferably, for each ECU in the same ECU group), as set forth above, the probability of mistaking a communication function failure for a relay OFF state can be reduced to improve detection accuracy.

In detecting a relay error at step S130, detection is made that relay RL1 is ON while relay RL2 is OFF. In such a state, an error of relay RL1 being turned ON erroneously (incorrect ON error) and an error of relay RL2 being turned OFF erroneously (incorrect OFF error) has occurred.

The method of identifying an incorrect ON error and incorrect OFF error as well as a preferable error procedure when an error is identified will be described hereinafter.

Figure 3:
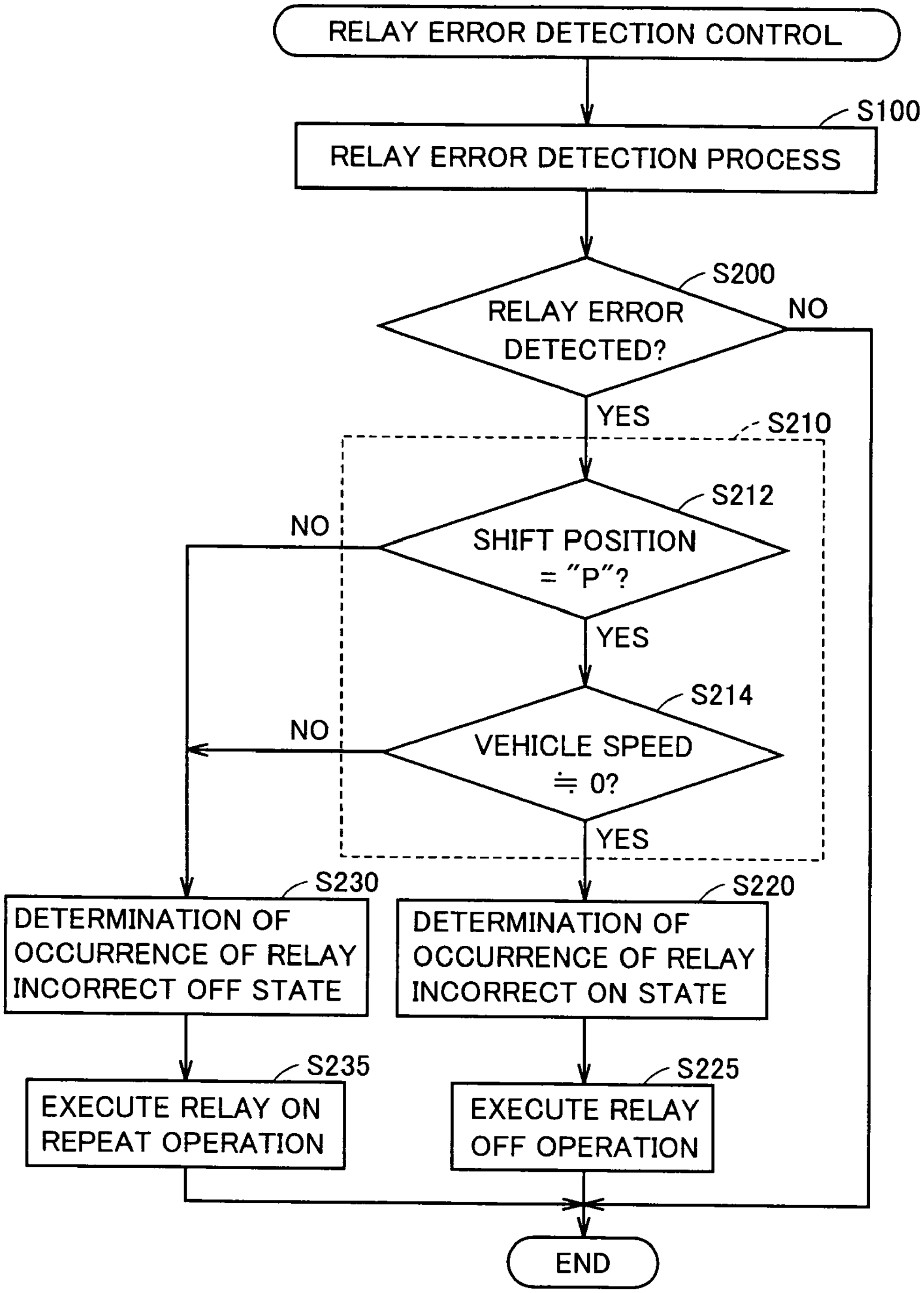
FIGS. 3, 4 and 5 are flow charts of first, second, and third examples, respectively, of an error process in a relay error detection mode.

At step S200 of FIG. 3, relay error detector 70 identifies whether a relay error has been detected by error detection step S100 (FIG. 2).

When a relay error has been detected (YES at step S200), control proceeds to step S210 where relay error detector 70 determines whether the vehicle is in an operation halt state or not.

For example, step S210 includes step S212 determining whether the shift position operated by the driver is the so-called P position (parking position), and step S214 determining whether the vehicle speed at that point in time is in the vicinity of 0.

The determination at step S212 can be executed based on an output from a sensor that detects the shift lever position provided at the shift lever (not shown) operated by the driver. The determination made at step S214 is based on the output of a vehicle speed sensor not shown, and can be executed by comparing the sensor output value (vehicle speed) with a predetermined value in the vicinity of 0.

When steps S212 and S214 both provide the results of YES, determination is made of "a vehicle halt state" for the overall step S210. In this case, it is assumed that each relay is to be set at an OFF state since the vehicle operation is at a halt at this point in time and determination is made that power supply to each ECU is not necessary. Therefore, relay error detector 70 detects occurrence of a relay incorrect ON state by step S220. In other words, determination is made that relay RL1 corresponding to a communication enabled ECU is turned ON erroneously.

When at least one of steps S212 and S214 provides a NO result, determination is made of "not in vehicle halt state" for the overall step S210. In this case, it is assumed that each relay should be ON since the vehicle operation is not at a halt at the current point in time and determination is made that power must be supplied to each ECU. Therefore, relay error detector 70 detects occurrence of a relay incorrect OFF state by step S230. In other words, determination is made that relay RL2 corresponding to a communication disabled ECU is turned OFF erroneously.

Thus, determination can be made whether the relay error state detected at error detection step S100 is either an incorrect ON error or incorrect OFF error based on the vehicle state at step 210, i.e. whether in a vehicle halt state or not.

The determination made at step S210 may further include, in combination, the determination of the engine speed being lower than a predetermined speed. An arbitrary determination method not limited to the example shown in FIG. 3 can be employed, as long as determination can be made of whether in a "vehicle halt state" or not.

At step S225 executed subsequent to step S220, relay error detector 70 executes a relay OFF operation with respect to the relay in an incorrect ON state (relay RL1 in this example). For example, the relay OFF operation of step S225 can be implemented by designating relay error detector 70 to issue an OFF instruction of relay RL1 to power supply ECU 50.

In the case of hardware failure such as welding at relay RL1, the power supply cannot be cut off by the control operation of power supply ECU 50. A configuration may be employed in which the driver is notified of the ON failure of relay RL1 by a display on a diagnostic monitor or the like (not shown) in the case where a similar relay error is detected even after execution of step S225.

At step S235 executed subsequent to step S230, relay error detector 70 executes a relay ON repeat operation with respect to the relay in an incorrect OFF state (relay RL2 in present example). For example, the relay ON repeat operation of step S235 is implemented by designating relay error detector 70 to issue an ON instruction of relay RL2 to power supply ECU 50.

Figure 4:
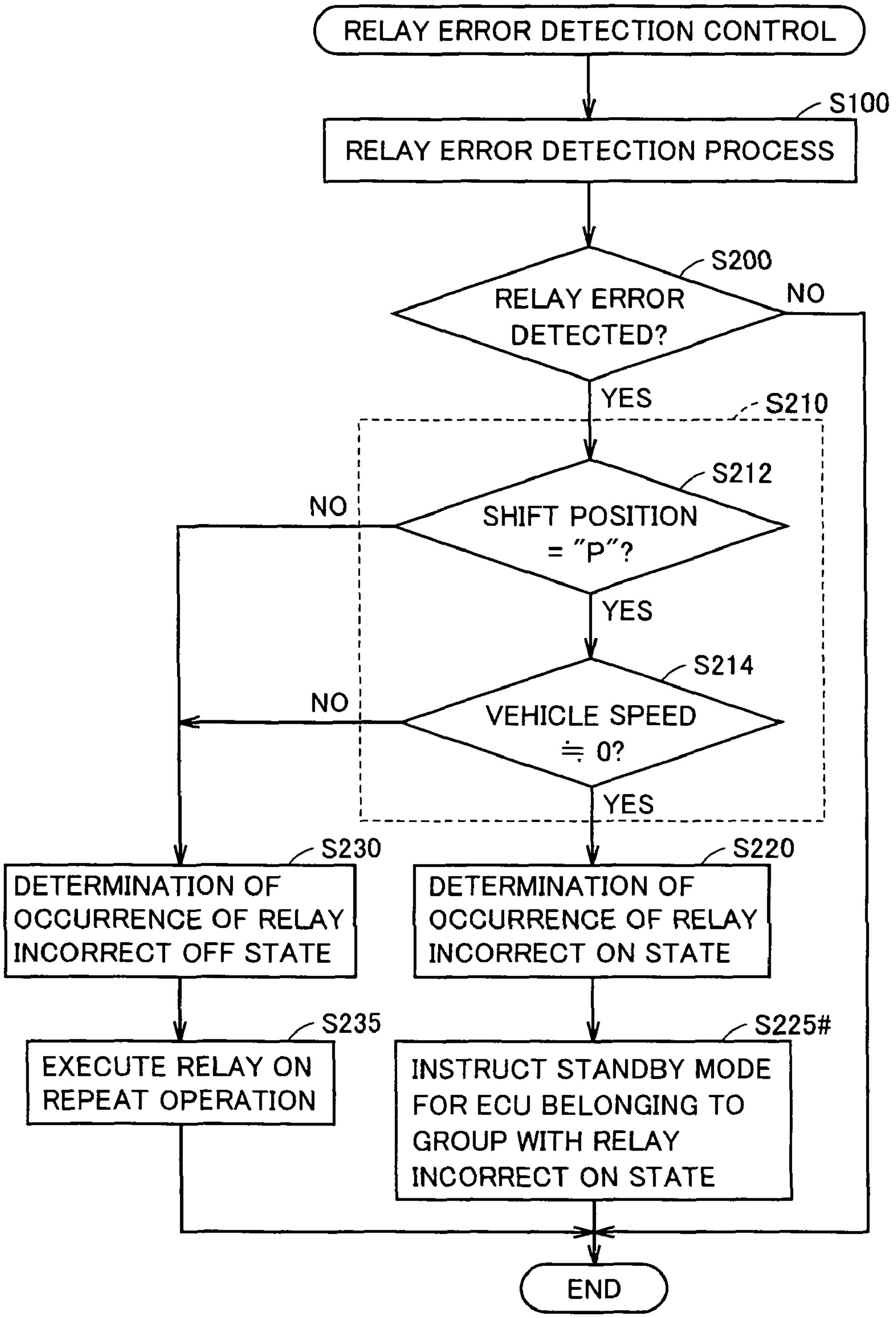

Alternatively as shown in FIG. 4, step S225# can be executed instead of step S225 subsequent to step S220 detecting a relay incorrect ON state. At step S225#, relay error detector 70 instructs transition to a standby mode for the ECU belonging to the ECU group in which the relay incorrect ON state has been identified. In the present embodiment, the standby mode is defined as an operation mode in which power consumption is lower as compared to that of a normal operation. Accordingly, continuous power consumption at an ECU caused by continuous power supply under the circumstances in which the relay should be essentially OFF can be reduced to prevent the battery of power supply 30 from running down.

The process of step S225# is particularly advantageous in that unnecessary power consumption at each ECU can be reduced even in the case where a relay is in an incorrect ON state due to hardware failure.

Figure 5:
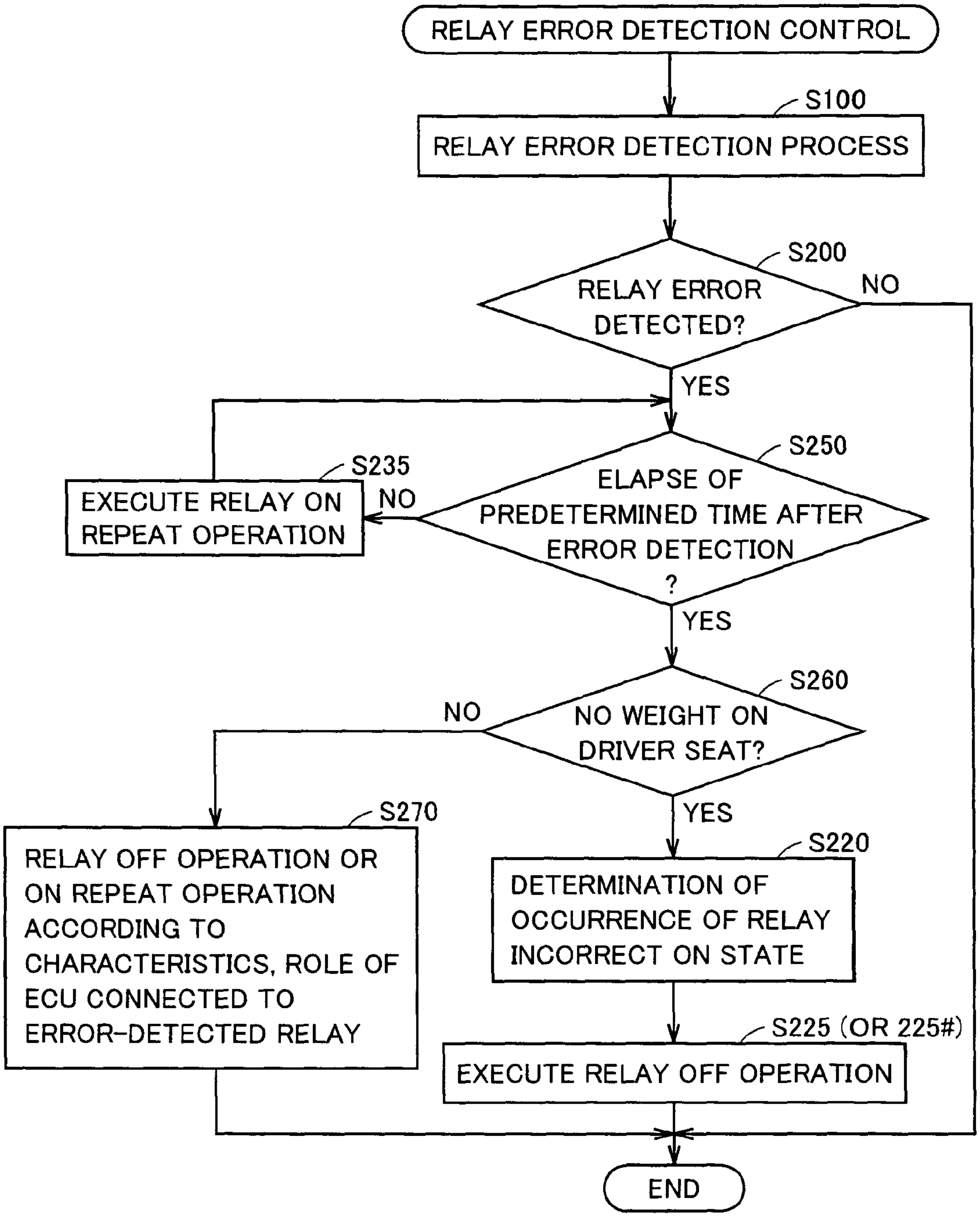

FIG. 5 represents an error procedure when a relay error is detected according to a vehicle state determination method differing from those of FIGS. 3 and 4.

Referring to FIG. 5, following execution of steps S100 and S200 likewise those in FIGS. 3 and 4, relay error detector 70 determines at step S250 whether a predetermined time has elapsed after detecting a relay error at error detection step S100.

Until elapse of the predetermined time (NO at step S250), relay error detector 70 executes a relay ON repeat operation with respect to the relay corresponding to the ECU group in which an ECU is in a communication disabled state at step S235. The relay ON repeat operation at this stage may be executed for each relay.

By continuing power supply to each ECU until the predetermined time has elapsed even when a relay error has been detected, vehicle operation can be continued with each ECU in an operable state.

At an elapse of the predetermined time (YES at step S250), relay error detector 70 executes step S260 to determine whether the driver of the vehicle is present or absent. Determination at step S260 is executed based on the output of a weight sensor (not shown) provided at the driver seat. Alternatively, determination of the presence/absence of the driver can be made by image recognition using an on-vehicle camera or the like.

When YES at step S260, i.e. the predetermined time has elapsed from detection of a relay error and the vehicle driver is not present at that point in time, step S220 and step S225 (or step 225#) shown in FIGS. 3 and 4 are executed, based on the assumption that the vehicle is in an operation halt state. Thus, a relay in an incorrect ON state is turned OFF, or each ECU connected to the relay in an incorrect ON state is set to a standby mode, whereby unnecessary power consumption is reduced to prevent the battery from running down.

When NO at step S260, i.e. when the driver is present at an elapse of the predetermined time from detecting a relay error, a relay OFF operation or a relay ON repeat operation is executed via power supply ECU 50 such that a desirable ON/OFF state for each predetermined relay is implemented corresponding to the characteristics or role of the ECUs belonging to respective ECU groups 10A and 10B. For example, power consumption can be reduced by cutting off power supply to an ECU that does not have a significant effect on the vehicle operation even if the operation is stopped while continuing power supply to an ECU that has an effect on the vehicle operation. Thus, a balance can be achieved between ensuring the vehicle operating function and saving battery power.

By determining the vehicle state in which each relay is to be turned ON or OFF by steps S250 and S260 as set forth above, an appropriate process can be executed with respect to an erroneous relay upon identifying whether the relay is in an incorrect ON state or incorrect OFF state.

Further, an error procedure in association with a relay error detected state can be conducted by combining the process of the flow charts of FIGS. 3 and 4 and the flow chart of FIG. 5. For example, a configuration can be employed in which the flow chart of FIG. 3 or FIG. 4 is executed at a NO determination by step S260 of FIG. 5 to further ensure the determination of whether the relay is to be turned ON or OFF.

The corresponding relationship between the flow charts of FIGS. 3 and 5 and the configuration of the present invention will be described hereinafter.

Error detection step S100 corresponds to “relay error detection means” of the present invention. Steps S210, S250 and S260 correspond to “vehicle state determination means” of the present invention. Particularly, step S210 corresponds to “operation halt determination means”, step S250 corresponds to “timer means”, and step S260 corresponds to “occupant determination means” of the present invention.

Further, steps S220 and S230 correspond to “error determination means” of the present invention. Step S225 corresponds to “power cut-off means” of the present invention. Step S225# corresponds to “power consumption reduction means” of the present invention. Step S235 corresponds to “power supply restore means” of the present invention. Step S270 corresponds to “error procedure means” of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic control apparatus for a vehicle, comprising:

a plurality of electronic control units classified under a plurality of groups;

a relay provided for each of the plurality of groups, and connected between the electronic control units belonging to a corresponding group of the plurality of groups and a power supply;

relay control means for generating a signal that controls an ON and OFF of the relay according to an operation instruction to the vehicle;

communication means connected to at least one of the electronic control units in the plurality of groups, for establishing communication with the connected electronic control units; and relay error detection means provided in at least one of the electronic control units connected to the communication means for detecting, based on communication state information indicating a communication enabled state or communication disabled state of each of the electronic control units connected to the communication means, an error of the relay when the communication state information is inconsistent between the plurality of groups.

2. The electronic control apparatus for a vehicle according to claim 1, wherein a plurality of the electronic control units is connected to the communication means in each of the groups; and the relay error detection means detects the error of the relay when each of the electronic control units belonging to the group where the relay error detection means is included is in the communication enabled state and each of the electronic control units connected to the communication means in another group is in the communication disabled state.

3. The electronic control apparatus for a vehicle according to claim 1, further comprising:

vehicle state determination means for determining a state of the vehicle when a relay error is detected by the relay error detection means; and error determination means for determining, according to a determination result by the vehicle state determination means, which of a first error and a second error has occurred, the first error corresponding to a case where the relay corresponding to the corresponding group in which the electronic control unit in the communication enabled state belongs is erroneously ON, and the second error corresponding to a case where the relay corresponding to the corresponding group in which the electronic control unit in the communication disabled state belongs is erroneously OFF.

4. The electronic control apparatus for a vehicle according to claim 3, wherein the vehicle state determination means includes operation halt determination means for determining whether the vehicle is in an operation halt state when the relay error is detected by the relay error detection means; and the error determination means including means for determining that the relay corresponding to the group in which the electronic control unit in the communication enabled state belongs is erroneously ON when determination is made of the vehicle being in the operation halt state.

5. The electronic control apparatus for a vehicle according to claim 4, further comprising power supply cut-off means for instructing the relay control means to turn OFF the relay determined as being erroneously ON by the error determination means.

6. The electronic control apparatus for a vehicle according to claim 4, further comprising power consumption reduction means for instructing transition to a standby mode for each of the electronic control units belonging to the group corresponding to the relay determined as being erroneously ON by the error determination means.

7. The electronic control apparatus for a vehicle according to claim 3, wherein the vehicle state determination means includes operation halt determination means for determining whether the vehicle is in an operation halt state when the relay error is detected by the relay error detection means; and the error determination means including means for determining that the relay corresponding to the group in which the electronic control unit in the communication disabled state belongs is erroneously OFF when determination is made of the vehicle not being in the operation halt state.

8. The electronic control apparatus for a vehicle according to claim 7, further comprising power supply restore means for instructing the relay control means to turn ON the relay determined as being erroneously OFF by the error determination means.

9. The electronic control apparatus for a vehicle according to claim 3, wherein the vehicle state determination means includes timer means for sensing elapse of a predetermined time from a point in time of detecting the relay error, when detected by the relay error detection means; and the electronic control apparatus further comprising power supply restore means for instructing the relay control means to turn ON the relay corresponding to the group in which the electronic control unit in the communication disabled state belongs until the elapse of the predetermined time is sensed by the timer means.

10. The electronic control apparatus for a vehicle according to claim 9, wherein the vehicle state determination means further includes occupant determination means for determining whether a driver of the vehicle is present or not when the elapse of the predetermined time is sensed by the timer means; and the electronic control apparatus further comprising power supply cut-off means for instructing the relay control means to turn OFF each of the relays when determination is made that the driver is not present by the occupant determination means.

11. The electronic control apparatus for a vehicle according to claim 9, wherein the vehicle state determination means further includes occupant determination means for determining whether a driver of the vehicle is present or not when the elapse of the predetermined time is sensed by the timer means; and the electronic control apparatus further comprising power consumption reduction means for instructing transition to a standby mode for each of the electronic control units in the group in which the electronic control unit in the communication enabled state belongs when determination is made of the driver not being present by the occupant determination means.

12. The electronic control apparatus for a vehicle according to claim 9, wherein the vehicle state determination means further includes occupant determination means for determining whether a driver of the vehicle is present or not when the elapse of the predetermined time is sensed by the timer means;

the electronic control apparatus further comprising error procedure means for instructing the relay control means to turn each of the relays ON or OFF based on a predetermined pattern when determination is made of the driver being present by the occupant determination means; and the predetermined pattern being determined in advance taking into account a function of the electronic control unit belonging to each group.

13. An electronic control apparatus for a vehicle, comprising:

a plurality of electronic control units classified under a plurality of groups;

a relay provided for each of the plurality of groups, and connected between the electronic control units belonging to a corresponding group and a power supply;

a relay control portion generating a signal that controls an ON and OFF of the relay according to an operation instruction to the vehicle;

a communication portion connected to at least one of the electronic control units in the plurality of groups, and configured to establish communication with the connected electronic control unit; and a relay error detection portion provided in at least one of the electronic control units connected to the communication portion, wherein, based on communication state information indicating a communication enabled state or communication disabled state of each of the electronic control units connected to the communication portion, the relay error detection portion detects an error of the relay when the communication state information is inconsistent between the plurality of groups.

14. The electronic control apparatus for a vehicle according to claim 13, wherein a plurality of the electronic control units is connected to the communication portion in each of the plurality of groups; and the relay error detection portion detects a relay error when each of the electronic control units belonging to the group where the relay error detection portion is included is in the communication enabled state and each of the electronic control units connected to the communication portion in another group is in the communication disabled state.

15. The electronic control apparatus for a vehicle according to claim 13, further comprising:

a vehicle state determination portion determining a state of the vehicle when a relay error is detected by the relay error detection portion; and an error determination portion determining, according to a determination result by the vehicle state determination portion, which of a first error and a second error has occurred, the first error corresponding to a case where the relay corresponding to the group in which the electronic control unit in the communication enabled state belongs is erroneously ON, and the second error corresponding to a case where the relay corresponding to the group in which the electronic control unit in the communication disabled state belongs is erroneously OFF.

16. The electronic control apparatus for a vehicle according to claim 15, wherein the vehicle state determination portion includes an operation halt determination portion determining whether the vehicle is in an operation halt state when the relay error is detected by the relay error detection portion; and the error determination portion determining that the relay corresponding to the group in which the electronic control unit in the communication enabled state belongs is erroneously ON when determination is made of the vehicle being in the operation halt state.

17. The electronic control apparatus for a vehicle according to claim 16, further comprising a power supply cut-off portion instructing the relay control portion to turn OFF the relay determined as being erroneously ON by the error determination portion.

18. The electronic control apparatus for a vehicle according to claim 16, further comprising a power consumption reduction portion instructing transition to a standby mode for each of the electronic control units belonging to the group corresponding to the relay determined as being erroneously ON by the error determination portion.

19. The electronic control apparatus for a vehicle according to claim 15, wherein the vehicle state determination portion includes an operation halt determination portion determining whether the vehicle is in an operation halt state when the relay error is detected by the relay error detection portion; and the error determination portion determining that the relay corresponding to the group in which the electronic control unit in the communication disabled state belongs is erroneously OFF when determination is made of the vehicle not being in the operation halt state.

20. The electronic control apparatus for a vehicle according to claim 19, further comprising a power supply restore portion instructing the relay control portion to turn ON the relay determined as being erroneously OFF by the error determination portion.

21. The electronic control apparatus for a vehicle according to claim 15, wherein the vehicle state determination portion includes a timer portion sensing elapse of a predetermined time from a point in time of detecting the relay error, when detected by the relay error detection portion; and the electronic control apparatus further comprising a power supply restore portion instructing the relay control portion to turn ON the relay corresponding to the group in which the electronic control unit in the communication disabled state belongs until the elapse of the predetermined time is sensed by the timer portion.

22. The electronic control apparatus for a vehicle according to claim 21, wherein the vehicle state determination portion further includes an occupant determination portion determining whether a driver of the vehicle is present or not when the elapse of the predetermined time is sensed by the timer portion; and the electronic control apparatus further comprising a power supply cut-off portion instructing the relay control portion to turn OFF each of the relays when determination is made that the driver is not present by the occupant determination portion.

23. The electronic control apparatus for a vehicle according to claim 21, wherein the vehicle state determination portion further includes an occupant determination portion determining whether a driver of the vehicle is present or not when the elapse of the predetermined time is sensed by the timer portion; and the electronic control apparatus further comprising a power consumption reduction portion instructing transition to a standby mode for each of the electronic control units in the group in which the electronic control unit in the communication enabled state belongs when determination is made of the driver not being present by the occupant determination portion.

24. The electronic control apparatus for a vehicle according to claim 21, wherein the vehicle state determination portion further includes an occupant determination portion determining whether a driver of the vehicle is present or not when the elapse of the predetermined time is sensed by the timer portion;

the electronic control apparatus further comprising an error procedure portion instructing the relay control portion to turn each of the relays ON or OFF based on a predetermined pattern when determination is made of the driver being present by the occupant determination portion; and the predetermined pattern being determined in advance taking into account a function of the electronic control unit belonging to each group.

25. The electronic control apparatus for a vehicle according to claim 1, wherein each of the plurality of electronic control units attains the communication enabled state or the communication disabled state according to the state of the communication capability when power is turned on, and attains the communication disabled state regardless of the state of communication capability when power is off.

26. The electronic control apparatus for a vehicle according to claim 13, wherein each of the plurality of electronic control units attains the communication enabled state or the communication disabled state according to a state of the communication capability when power is turned on, and attains the communication disabled state regardless of the state of communication capability when power is off.

27. The electronic control apparatus for a vehicle according to claim 1, wherein the relay error detection means detects an error independent of using a signal directed to controlling the relay.

28. The electronic control apparatus for a vehicle according to claim 13, wherein the relay error detection means detects an error independent of using a signal directed to controlling the relay.

* * * * *